United States Patent [19]

Kiyohara et al.

[11] Patent Number: 4,898,897

[45] Date of Patent: Feb. 6, 1990

[54] PROCESS FOR PRODUCING POLYESTER RESIN COMPOSITION

[75] Inventors: Kazuto Kiyohara; Toshiaki Yamazaki; Ichiya Harada; Takanori Nakadate, all of Hino; Kentaro Noguchi, Hofu; Michiteru Nakano, Hofu; Shigeru Sakae, Hofu; Kazuhiro Okuma, Hofu, all of Japan

[73] Assignees: Konica Corporation; Kanebo Ltd., both of Japan

[21] Appl. No.: 184,389

[22] Filed: Apr. 21, 1988

[30] Foreign Application Priority Data

Apr. 24, 1987 [JP] Japan ............................... 62-101310
Apr. 25, 1987 [JP] Japan ............................... 62-102810

[51] Int. Cl.$^4$ .......................... C08K 3/36; C08K 3/34; C08K 3/30; C08K 3/26
[52] U.S. Cl. ..................................... 523/343; 523/348; 524/423; 524/425; 524/430; 524/432; 524/447; 524/451; 524/604; 524/605
[58] Field of Search ............... 524/605, 604, 878, 451, 524/423, 432, 425, 430, 447; 523/343, 348

[56] References Cited

U.S. PATENT DOCUMENTS

| | | | |
|---|---|---|---|
| 3,275,590 | 9/1966 | Thomas | 524/878 |
| 3,565,852 | 2/1971 | Conix et al. | 524/425 |
| 3,575,919 | 4/1971 | Busweiler et al. | 524/605 |
| 3,663,499 | 5/1972 | Brinkmann | 524/605 |
| 3,663,512 | 5/1972 | Uebee | 524/605 |
| 3,862,084 | 1/1975 | Zandstra et al. | 524/425 |

FOREIGN PATENT DOCUMENTS

61-250034 11/1986 Japan .

*Primary Examiner*—Lewis T. Jacobs
*Attorney, Agent, or Firm*—Jordan B. Bierman

[57] ABSTRACT

A process for producing a polyester resin composition containing at least 10 wt % of a white inorganic pigment dispersed in a polyester resin, which comprises kneading the polyester resin with the white inorganic pigment and thereafter subjecting the blend to a polycondensation reaction at a temperature ranging from the melting point of the polyester up to 300° C. and at a reduced pressure of not higher than 5 Torr, is disclosed.

17 Claims, 4 Drawing Sheets

PROCESS FOR PRODUCING POLYESTER RESIN COMPOSITION

BACKGROUND OF THE INVENTION

The present invention relates to a process for producing a polyester resin composition suitable for use as a starting material for the production of a white film. More particularly, the present invention relates to a process for producing a polyester resin composition of high quality having a high concentration ($\leqq 10$ wt %) of a white inorganic pigment dispersed uniformly in a polyester resin.

White inorganic pigments typified by titanium dioxide are conventionally dispersed in polyester resins typified by polyethylene terephthalate (PET) by either one of the following methods: adding such pigments per se; or suspending them in an ester-forming polyhydric alcohol such as ethylene glycol to prepare a slurry and adding the slurry during the process of ester exchange or esterification reactions and before polycondensation. The latter method is disclosed in many prior patents such as Japanese Patent Publication Nos. 945/1958, and 18135/1981. But this method has the problem that the particles of white inorganic pigment added tend to agglomerate and precipitate in the resulting polymer, and the amount of pigment that can be incorporated is no more than several percent.

If one wants to incorporate a fairly large amount ($\leqq 10$ wt %) of white inorganic pigment in a polyester resin and make a uniform dispersion, the viscosity of the polyester resin must be increased and high shear force must be applied. To this end, a twin-screw kneading extruder is usually employed and in order to knead the white inorganic pigment for producing a uniform dispersion, the rotational speeds of the screws and the residence time must be increased. However, if kneading operations are performed under these conditions, the high shear force applied generates heat and the resulting resin composition suffers from such troubles as reduction in the degree of polymerization, coloration and formation of decomposition products. Thermal deterioration occurring in polyester resins exposed to the conditions described above is particularly estensive and has caused serious problems in association with the quality of the final product.

With a view to solving these problems, Unexamined Published Japanese Patent Application (hereinafter referred to as OPI) No. 250034/1986 proposes a method that comprises mixing a polyester resin with a pigment in molten state to prepare a master batch, subjecting the master batch to solid-phase polymerization, and mixing the resulting polymer with another feed of the polyester resin. In this method, the step of solid-phase polymerization is continued for as long as 5–20 hours in order to increase the degree of polymerization that has dropped on account of thermal deterioration and to remove the by-products resulting from decomposition. However, this method still suffers from such disadvantages as increased running costs and inadequacy in the quality of the finally obtained resin composition.

Japanese Patent Publication No. 17664/1973 discloses a method for preventing the decrease in the molecular weight of a resin by kneading it with a twin-screw kneader or a roller kneader placed under vacuum, an inert gas stream or some other condition that is isolated from the atmosphere. This is a good method for preventing the decrease in the molecular weight of a resin to be mixed with a pigment. However, in order to attain a sufficiently wide surface area in a twin-screw kneader to provide an increased molecular weight under vacuum, a certain space is necessary between the barrel and each screw but then the shear foce produced between the barrel and the screws is reduced or the "short pass" of the molten polymer causes insufficient dispersion of the pigment particles in the polymer. For these reasons, the method described in Japanese Patent Publication No. 17664/1973 is not suitable for the purpose of kneading pigments that have a great tendency for agglomeration. With a roller kneader, the clearance between rollers must be precisely maintained at about several tens of microns. However, if the throughput is several hundreds of kilograms per hour, it is extremely difficult to keep this level of precision in the temperature range set forth in said patent unless very expensive equipment is employed.

Japanese Patent Application (OPI) No. 212908/1983 discloses a method in which a molten plastic is fed into a twin-screw kneader/extruder and kneaded with additives, followed by combining the blend with another supply of the molten plastic in the rear portion of the extruder so as to inhibit excessive heat generation while ensuring the necessary throughput. The problem with this method is that it does not have any means for restoring the resin from its thermal deterioration due to the heat generated during the kneading operation and that a comparatively high degree of kneading is necessary in order to attain a uniform dispersion after the blend of resin and additives is combined with another supply of the resin. To meet this need, either the residence time or the rotational speeds of the screws must be increased but then the generation of heat will take place again.

SUMMARY OF THE INVENTION

An object, therefore, of the present invention is to provide an improved process for producing a polyester resin composition adapted to the fabrication of white films by mixing a white inorganic pigment with a polyester resin in molten state. According to the present invention, not only is the production cost reduced but also the deterioration of physical properties on account of such reasons as reduced degree of polymerization, sub-standard color, and formation of by-products can be minimized while ensuring uniform dispersion of the white inorganic pigment particles.

This object of the present invention can be attained by a process for producing a polyester resin composition containing at least 10 wt % of a white inorganic pigment dispersed in a polyester resin, which comprises kneading the polyester resin with the white inorganic pigment and thereafter subjecting the blend to a polymerization reaction at a temperature ranging from the melting point of the polyester up to 300° C. and at a reduced pressure of up to 5 Torr.

DETAILED DESCRIPTION OF THE INVENTION

Figure 1:
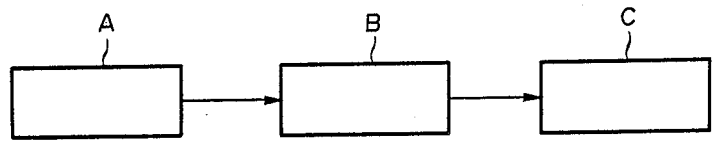
FIG. 1 is a block diagram of a system that may be employed to implement the process of the present invention.

The polyester resin used in the present invention may of course be a thermoplastic resin solely composed of a polyester. Included within the scope of the "polyester resin" are blends of a polyester and other polymers or additives that are incorporated in such amounts that the resin characteristics of the polyester as the chief component will not be affected for practical purposes.

Polyester resins that can be used in the present invention are polymers of the condensation products of aromatic dicarboxylic acids (e.g., terephthalic acid, isophthalic acid, phthalic acid, and naphthalenedicarboxylic acid) and glycols (e.g., ethylene glycol, 1,3-propanediol and 1,4-butanediol), and specific examples are polyethylene terephthalate, polyethylene 2,6-dinaphthalate, polypropylene terephthalate, polybutylene terephthalate, and copolymers thereof. Polyethylene terephthalate (hereinafter abbreviated as PET) is preferably used as a polyester resin in the present invention.

The polyester resin to be used in the present invention preferably has an intrinsic viscosity (hereinafter abbreviated as IV) of at least 0.40, more preferably between 0.50 and 1.20, most preferably between 0.60 and 1.00, as measured at 20° C. in a solution of the polyester in a mixed solvent of phenol and 1,1,2,2-tetrachloroethane at a weight ratio of 3:2.

The white inorganic pigment for use in the present invention is such a pigment that when a dispersion prepared by kneading it with the polyester resin is drawn into a film, it will impart whiteness to the film. Included with the definition of this white inorganic pigment are not only those which are of white color but also those which produce voids in the film and which make the film assume a white color by causing random reflection. Examples of the white inorganic pigment are talc, lithopone, titanium dioxide, zinc oxide, barium sulfate, calcium carbonate, alumina, silica and kaolin, which may be used either on their own or as admixtures. The process of the present invention is applied most preferably when titanium dioxide is added as a white inorganic pigment.

The titanium dioxide used in the present invention is preferably of the rutile and/or anatase type. The titanium dioxide has an average particle size of 0.1–0.5 μm.

The titanium dioxide is desirably surface-treated to ensure effective dispersion of its particles. The surface treatment is performed in order to provide the particles of titanium dioxide with affinity for the polyester resin and consists of treating such particles with an aluminum compound (e.g. alumina) and/or a silicon compound (e.g. silica) that have an oxygen or hydroxyl bond. After this treatment, the titanium dioxide may be subjected to further surface treatments with metal soaps, surfactants, coupling agents, organosilane compounds and polyhydric alcohols.

The titanium dioxide used in the present invention preferably has a water content of no more than 0.5%. The water content of titanium dioxide can be measured by the following method specified in "Pigment Test Methods, Section 21" under JIS K 5101: A prescribed amount of a sample is correctly measured in a pre-dried flat-bottom weighing bottle (50 ml) and spread on its bottom as uniformly as possible as a layer; after stoppering the bottle, its weight is measured; the stopper is then removed and both the bottle and the stopper are dried in a dryer held at 110° C. for 2 hours; they are transferred into a desiccator and left to cool; after replacing the stopper on the bottle, its weight is measured to determine the weight loss; the water content of the sample, K (%), can be calculated by the following formula: $K = (L/S) \times 100$ where L is the weight loss (g) and S is the mass of the sample (g).

The process of the present invention will prove to be effective when the white inorganic pigment described above is present in an amount of at least 10 wt % in the finally obtained polyester resin composition, and a particularly great effectiveness can be attained if the pigment content is in the range of 10–30 wt %.

Other additives in common use, such as brighteners, dyes, uv absorbers, antistats and antioxidants, may also be incorporated in amounts that will not be detrimental to the objective of the present invention.

Polymeric materials other than polyesters can also be added and suitable examples are polyolefins such as polyethylene and polypropylene.

In accordance with the present invention, a polyester resin composition that contains the white inorganic pigment particles that have been adequately dispersed by passage through a kneading extruder emerges from the extruder and, without being allowed to solidify, is subjected to a polycondensation reaction at a temperature ranging from the melting point of the polyester up to 300° C. and at a reduced pressure of not higher than 5 Torr.

The polycondensation reaction is usually carried out in a polycondensation reactor, which is employed to attain the following two purposes: first, the polymer being fed from the kneading extruder is hot and its temperature will fluctuate with time, so a uniform temperature distribution must be attained by means of the polycondensation reactor; secondly, the polymer has undergone thermal deterioration on account of the temperature elevation occurring in the kneading extruder, so in order to prevent deterioration of its quality such as reduction in the degree of polycondensation, the polymer is passed through the polycondensation reactor and the degree of its polycondensation is increased to attain a desired stable viscosity at the outlet of the reactor. The polycondensation reactor used to attain these objectives is preferably equipped with agitating elements that are capable of not only providing a uniform temperature distribution for the polymer but also keeping the polymer surface always exposed to the reactive condition. Since the polyester resin composition usually has a high viscosity of at least 1,000 poises, the agitating elements are preferably in the form of disk propellers mounted on two horizontal shafts. For the purpose of shortening the residence time in the kneading extruder while reducing thermal deterioration of the polymer, it is effective to have the kneading extruder function as a device that chiefly provides a shearing action for dispersing the white inorganic pigment to the stage of primary particles while agitating the polymer in the polycondensation reactor to achieve uniform dispersion of the polyester resin by a displacing or other action.

Needless to say, the agitating elements used in the polycondensation are in no way limited to the shape described above and any other type of agitating elements may be employed so long as the objective of the present invention can be attained.

The polyester resin will deteriorate very rapidly under high-temperature and pressure conditions and suffers from various problems such as reduced degree of polymerization, deviation from the desired color and an increased number of terminal carboxyl groups present. Furthermore, various byproducts, mostly acetoaldehyde, will form to cause the quality of the end product to be impaired when it is shaped. On the other hand, the polycondensation reaction proceeds faster than the rate of such deterioration at temperatures not higher than 300° C. and at a subatmospheric pressure. Therefore, in the present invention, it is preferred to inhibit the generation of heat in the kneading extruder either by using a coolant jacket or by charging another feed of polyester chips in the rear part of the extruder or to mix a cold polyester resin with the resin composition emerging from the extruder. Thereafter, the polymer is subjected to a polycondensation reaction at a temperature ranging from the melting point of the polyester up to 300° C., preferably between 275° and 290° C., more preferably between 275° and 285° C., and at a reduced pressure not higher than 5 Torr, preferably at 1 Torr and below. By this polycondensation reaction, the polymer can be restored from the decrease in the degree of polycondensation that has occurred in the kneading extruder.

The period for which the polymer is subjected to reaction in the polycondensation reactor may be selected at the value necessary to restore the decreased degree of polycondensation to a desired level. To this end, the reaction time is usually selected from the range of 5–60 minutes.

The degree of polycondensation of the polymer at the outlet of the polycondensation reactor can be estimated by measuring its viscosity, so it is of course possible to control the degree of vacuum in the reactor by detecting the viscosity of the polymer by an appropriate method and adjusting it to a constant level.

Various methods may be employed to add the white inorganic pigment to the polyester resin and to form a dispersion of the pigment particles in the resin. One method is to first dry-blend the resin and the pigment and then supply the blend into the kneading extruder; another method is to supply the kneading extruder with the resin and the pigment separately; alternatively, the resin may be supplied at two or more points. If desired, a twin-screw kneading extruder may be employed that is furnished with a kneading unit (e.g., kneading disks) or air vents. In a particularly preferred embodiment of the present invention, the white inorganic pigment is kneaded and dispersed in at least part of the molten polymer withdrawn from a continuous polycondensation apparatus, and the dispersion is mixed with the polyester resin also withdrawn from a polycondensation apparatus but which has not been kneaded with the white inorganic pigment for dispersing purposes, with the mixture being then subjected to a polycondensation reaction.

In the embodiment described above, the polyester resin to be kneaded with the white inorganic pigment and the one which is to be immediately supplied to the polycondensation reactor without being kneaded with the pigment may be taken out of the same or different continuous polycondensation apparatus. The molten polymer being fed from the continuous polycondensation apparatus and which is to be kneaded with the pigment is desirably cooled prior to the kneading operation. In order to carry out the intended reaction efficiently in the continuous polycondensation apparatus, the polyester resin is exposed to a reaction temperature higher than its melting point. For example, a PET resin is heated to about 280° C. which is higher than its melting point by about 20° C. When the polyester resin taken out of the continuous polycondensation apparatus is fed to the kneader, the temperature of the resin is further increased in proportion to the feed power. The viscosity (in poises) of the polyester decreases exponentially with increase in temperature whereas the shear force produced in the kneader increases in proportion to the viscosity of the resin. Therefore, in order to attain an efficient shear force, the temperature of the polymer must be low. However, if the polymer temperature is reduced, not only does it become difficult to feed the molten polymer smoothly to the kneader but also increased thermal deterioration of the polymer occurs on account of the residence time prolonged to ensure an adequate heat-transfer surface. In consideration of these circumstances, the temperature to which the polyester resin is exposed in the kneading extruder is preferably within the range from its melting point plus 5° to its melting point plus 25° C., more preferably from its melting point plus 5° C. to its melting point plus 15° C. As for the cooling apparatus, a complex design cannot be adopted since the resin flow is laminar and stagnancy in the piping can cause thermal deterioration of the resin. A double-pipe heat exchanger or some other cooling device that will not impede the resin flow is preferably used. The temperature of the resin in the piping will be uneven not only in its longitudinal direction but also across its diameter, so the piping to the polycondensation reactor is desirably equipped with a static mixing device such as a static mixer in order to produce a uniform temperature distribution for the resin.

The polyester resin to be fed into the polycondensation reactor without being kneaded with the white inorganic pigment is also preferably cooled before it is mixed with the polyester resin that has been kneaded with the pigment. This is necessary for cooling the polyester resin whose temperature has been elevated in the kneader. For this purpose, it is desired that the flow rate of the polyester resin to be fed into the reactor without passing through the kneader is higher than that of the polyester resin to be fed into the kneader. The exact flow rates of the two types of polyester resin are determined by several factors such as the concentration of the white inorganic pigment and the efficiency of kneading.

The polyester resin to be fed from the continuous polycondensation apparatus preferably has an IV of at least 0.40, more preferably 0.50–0.90, most preferably 0.60–0.80.

A kneader of the continuous extruder type is preferably employed in the present invention. In the embodiment described above where the resin need not be melted in the kneader, it is desirably of a type that merely performs kneading and dispersing actions. Suitable examples are: a twin-screw kneader in which the kneading action is chiefly produced by kneading disks; a continuous kneader having a construction similar to that of a Banbury mixer; and a continuous kneader that applies a shear force between a grooved disk mounted perpendicularly to the screw shaft and a fixed seat spaced from the disk by a very small clearance.

In order to have the white inorganic pigment uniformly dispersed in the polyester resin, the shear force applied must be strong enough to break down agglomerations into primary particles. The condition for producing the necessary shear force is that the white inorganic pigment be present in the polyester resin in high concentration and that individual pigment particles be spaced apart by a small distance. If shear is applied with th pigment concentration being low, the shear force is distributed within the polyester resin and a sufficiently great shear force will not be applied to the pigment particles to achieve efficient dispersion and kneading of the particles. The embodiment described in the previous paragraphs is very effective for attaining uniform dispersion of the pigment particles because the polyester resin in which the white inorganic pigment is uniformly dispersed has only a small difference in viscosity from the polyester resin to which no pigment has been added, and because no problem will occur such as insufficient dispersion due to agglomeration into secondary particles. A further advantage results from the fact that the power consumption and the shape of the kneader can be reduced as compared with the intended throughput. In the light of these considerations, the concentration of the white inorganic pigment in the kneader is preferably in the range of 20-60 wt %, more preferably 30-50 wt %. During the kneading operation, a large amount of heat will be generated on account of the shearing action, so the jacket and other parts in the section where heat is generated are preferably cooled by passage of a colling medium. It should also be mentioned that since the polyester resin undergoes thermal deterioration in proportion to temperature and residence time, the resin temperature should be lowered in a short period if a high degree of shearing is applied and hence an increased amount of heat is to be generated.

However, in case of a highly viscous fluid, the overall heat transfer coefficient with respect to a coolant is so low that it is difficult to lower the resin temperature by passing a coolant through the jacket. With a view to solving this problem, it has been proposed that the resin be mixed with a liquid whose boiling point is lower than the melting point of the resin and that this liquid be evaporated to deprive the resin of evaporation heat. However, very few liquids are available that are inert to polyester resins and which have high evaporation heat and no practical liquid has been found that is satisfactory in terms of both cost and handling aspects. It is therefore preferred that the temperature of the kneaded polyester resin composition is lowered by mixing it with a cold polyester resin in the manner described herein. Mixing of polyester resins is effected either in the pipe at the inlet of the polycondensation reactor or in the interior of this reactor, and the flow rate of the cold polyester resin to be added is determined by the concentration of the white inorganic pigment present in the kneader and its concentration in the final product.

In order to permit the incorporation of varying concentrations of the white inorganic pigment, metering pumps are desirably used to supply the resin in desired proportions to the kneader from the continuous polycondensation apparatus and then to the polycondensation reactor.

FIG. 1 is a block diagram of a system that may be employed to implement the process of the present invention. In FIG. 1, A, B and C denote a kneading extruder, a polymerization reactor, and a shaping apparatus, respectively.

Figure 4:
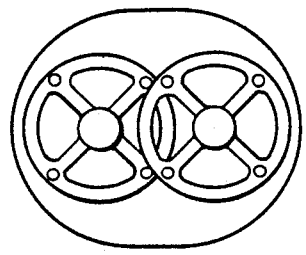
FIG. 4 is a cross section of a polycondensation reactor.
Figure 3:
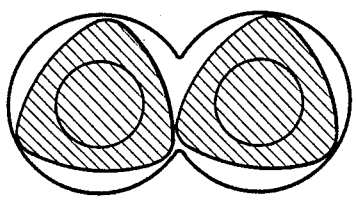
FIG. 3 is a cross section of a kneader.
Figure 2:
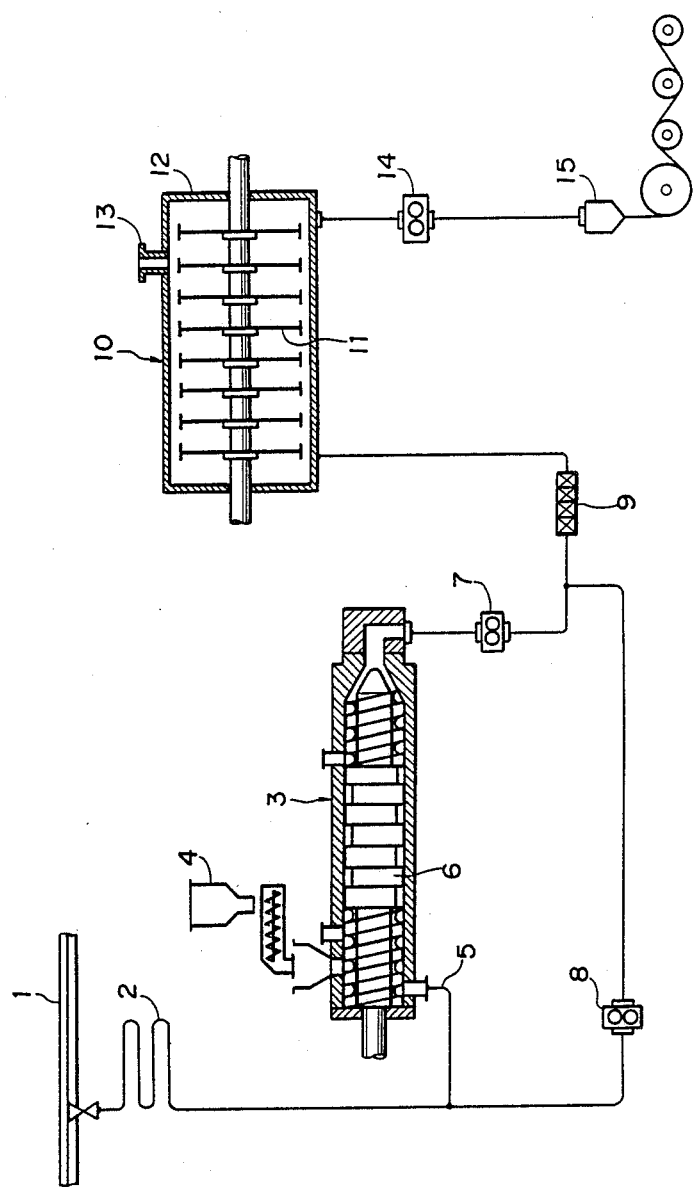
FIG. 2 is a schematic diagram showing a layout of system components that is advantageously used in the practice of the present invention.

FIG. 2 is a schematic diagram showing a layout of system components that is advantageously used in the practice of the present invention. A part of the polyester resin prepared in a continuous polycodensation apparatus (not shown) is taken out of the apparatus through a transfer pipe 1 and cooled by the coolant jacket around the transfer pipe 1 and by passage through a cooler 2. Part of the cooled polyester resin is fed into a kneader 3 through its inlet 5 and mixed with a white inorganic pigment being supplied from a pigment metering hopper 4. The kneading action of the kneader 3 is chiefly produced by kneading disks 6 mounted on two shafts and the heat generation occurring in the kneader is suppressed by circulating a coolant through an external jacket. The kneaded polyester resin emerging from the kneader 3 is sent to a polycondensation reactor 10 in a predetermined amount by means of a metering pump 7. The rotational speeds of the screws in the kneader 3 are so controlled that the input pressure on the metering pump 7 will be maintained at a constant level. The remaining part of the cooled polyester resin is sent toward the polycondensation reactor 10 by means of a metering pump 8 and mixed at the inlet piping on the reactor 10 with the kneaded polyester resin by means of a static mixer 9. The resulting mixture of the two polyester resins is charged into the polycondensation reactor 10, which contains in its interior a twin-screw disk type agitator 11 that performs a kneading action chiefly intended to ensure a wide surface area and effective displacement for the polycondensation reaction. A vapor pipe 13 on the reactor 10 is connected to a vacuum pump for maintaining a high degree of vacuum in the reactor. The reactor is surrounded with a jacket 12 through which a temperature-controlled heating medium is circulated in order to keep the temperature of the resin in the reactor at an appropriate value. In the reactor 10, the polyester resin is subjected to polycondensation at a reduced pressure of no higher than 5 Torr and at a temperature ranging from the melting point of the resin up to 300° C. The polycondensed polyester resin is then fed to a shaping apparatus 15 by means of a metering pump 14. FIGS. 3 and 4 show cross sections of the kneader 3 and polycondensation reactor 10, respectively.

Figure 5:
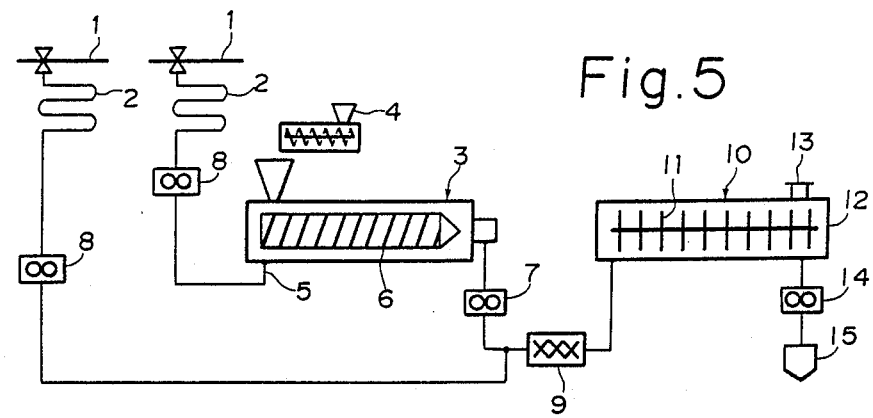
FIGS. 5, 6 and 7 are schematic diagrams showing other layouts of system components that are advantageously used in the practice of the present invention.
Figure 6:
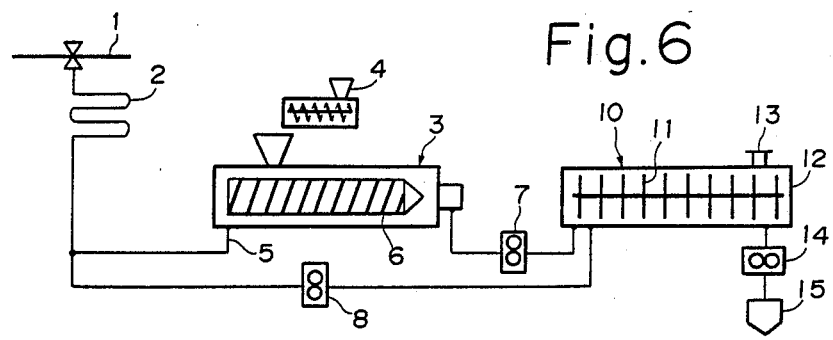
Figure 7:
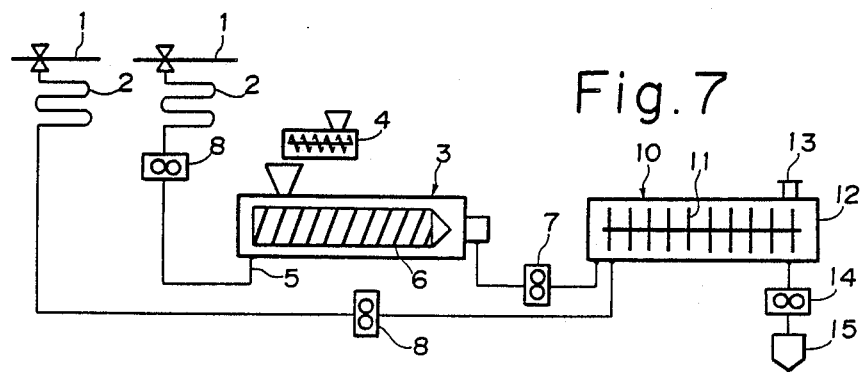

FIGS. 5-7 are schematic diagrams showing other layouts of system components that are advantageously used in the practice of the present invention. The components which are the same as those shown in FIG. 2 are identified by like numerals and detailed explanation thereof is omitted.

The forming apparatus 15 may be a film or pellet forming machine.

Figure 8:
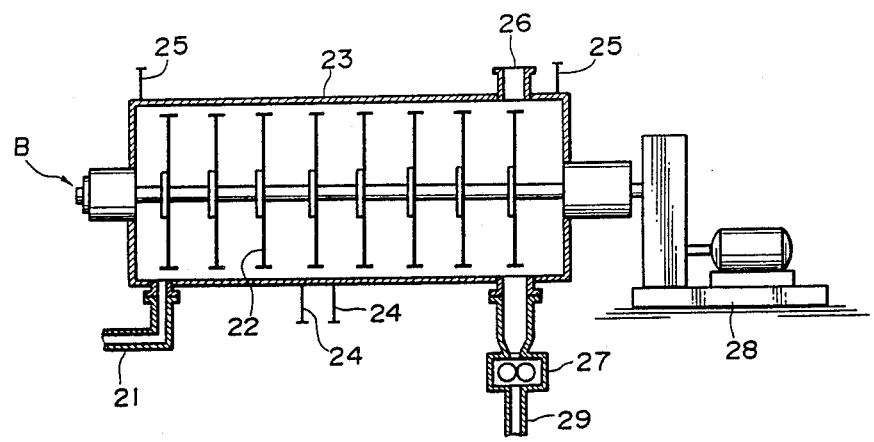
FIG. 8 is a longitudinal section of a polycondensation reactor which is advantageously used in the practice of the present invention.

FIG. 8 is a longitudinal section of the polycondensation reactor B. A molten resin composition emerging from the kneading extruder A is fed into the reactor B through its inlet 21 and moves forward to the delivery end as it is agitated by means of propellers 22 that are driven with a drive unit 28. The reactor B has an air vent 26 that is connected to a vacuum pump (not shown) for maintaining a desired degree of vacuum in the reactor B.

The reactor B is surrounded with a jacket 23 through which a temperature-controlled heating medium is circulated in order to maintain the temperature of the resin in the reactor B at an appropriate level. The heating medium is fed in through an inlet pipe 24 and goes out through an outlet pipe 25.

In the reactor B, the polyester resin feed is subjected to a polycondensationa polycondensation reaction at a temperature ranging from the melting point of the polyester up to 300° C. and at a reduced pressure not higher than 5 Torr, thereby obtaining a polyester resin composition that has been restored to a desired level of viscosity. The resin composition then emerges from an outlet 29 and is fed by means of a gear pump 27 either directly into the forming apparatus C or into a film forming apparatus after shaped into chips. Films can be produced by any known method such as the one described in Japanese Patent Application (OPI) No. 118746/1986. The film thus produced is useful as a reflective photographic support. For the preparation of reflective photographic materials using this film, see prior patents such as Japanese Patent Application (OPI) No. 118746/1986.

The following example is provided for the purpose of further illustrating the present invention but is in no way to be taken as limiting.

EXAMPLE 1

A hundred parts by weight of polyethylene terephthalate (PET) chips with IV of 0.74 and 20 parts by weight of anatase titanium dioxide having an average particle size of 0.3 μm and which had been surface-treated with small amounts of alumina, silica and polydimethyl siloxane were kneaded in a co-rotating twin-screw kneading extruder (Model PCM-65 of Ikegai Iron Works, Ltd.) at die temperature of 280° C. with the screws rotating at 150 rpm to produce a throughput of 100 kg/h. Without being allowed to solidify, the blend was subjected to a polycondensation reaction in a reactor of the type shown in FIG. 8 at 1.0 Torr for 15 minutes at 290° C. The extrudate was cooled with water and shaped into square (3 mm×3 mm) pellets.

The color of the pellets was measured with TC-1500DX, a color difference meter of Tokyo Denshoku K.K. The b value of the pellets was 1.5, indicating that the pellets were satisfactorily white with only a small intensity of yellowness. Observation of a pellet's cross section under an electron microscope at a magnification of 5,000 showed the absence of coarse particles with a diameter of 10 μm or more, indicating that the titanium dioxide particles had been uniformly dispersed in the resin matrix. The pellets were found to have an IV of 0.66.

The pellets were fed into an extruder at 290° C., from which the extrudate was brought into contact with a rotating chill drum so as to form an amorphous sheet 1.1 mm thick. The sheet was stretched first longitudinally at a draw ratio of 3.0 at 100° C., then transversely at a draw ratio of 3.0 at 110° C. The drawn sheet was heat-set at 200° C., cooled and wound up. The so prepared film had a thickness of 125 μm and was white and opaque. The drawing and shaping operations could successfully be performed in a continuous stable manner.

This film was purely white without any color that might have been produced by decomposition products of the polymer. It was therefore very useful as a reflective photographic support.

COMPARATIVE EXAMPLE 1

As in Example 1, 100 parts by weight of PET chips (IV, 0.74) and 20 parts by weight of anatase titanium dioxide having an average particle size of 0.3 μm and which had been surface-treated with small amounts of alumina, silica and polydimethyl siloxane were kneaded in a co-rotating twin-screw kneading extruder (PCM-65 of Ikegai Iron Works, Ltd.). The extrudate from the extruder was cooled with water and shaped into square pellets.

When the color of the pellets was measure, their b value was found to be 2.8, indicating that the yellowness of the pellets was undesirably intense. The pellets were found to have an IV of 0.54.

An attempt was made to prepare a film from the pellets as in Example 1 but the longitudinally stretched film ruptured during transverse stretching and continuous drawing operations were unsuccessful.

EXAMPLE 2

Kneading and polycondensation reaction were performed as in Example 1 except that the conditions for polycondensation reaction were 290° C., 2.5 Torr and 20 minutes. The resulting pellets had an IV of 0.65 and their b value was 2.0. The pellets were extruded and shaped into a film by biaxial drawing as in Example 1. Continuous drawing operations could be performed in a consistent way. The prepared film had a sufficient degree of whiteness and opacity to be useful as a reflective photographic support.

COMPARATIVE EXAMPLE 2

Kneading and polycondensation reaction were performed as in Example 1 except that the conditions for polycondensation reaction were 290° C., 6 Torr and 30 minutes. The resulting pellets had an IV of 0.48 which was too low to enable fabrication of a film from these pellets.

EXAMPLE 3

A polyester resin (PET) having an IV of 0.650, a temperature of 282° C. and a viscosity of ca. 3,000 poises was prepared in a continuous polycondensation apparatus. Part of the resin was withdrawn from the polycondensation apparatus through a transfer pipe and cooled with a cooling jacket and a cooler, through which a coolant of 256° C. was circulated. The polymer now having a temperature of 268° C. and a viscosity of ca 4,200 poises was fed into a kneader at a flow rate of 80 kg/h and kneaded there with titanium dioxide at a flow rate of 120 kg/h. The temperature of the polyester resin emerging from the kneader had increased up to 300° C. in spite of its cooling with a coolant at 80° C. passing through the external jacket. Using a static mixer, this polyester resin was mixed in a transfer pipe with a cold (268° C.) polyester resin (PET) at a flow rate of 400 kg/h. The resin blend was fed into a polycondensation reactor in which a polycondensation reaction was carried out with the external jacket controlled at 256° C. The other reaction conditions were as follows: 280° C. for the polymer temperature in the front portion of the reactor; 282° C. for the polymer temperature in the rear portion of the reactor; 1.2 Torr for the pressure in the reactor; and 18 minutes for residence time. The resulting polymer was extruded through a spinneret, from white a strand of filaments emerged and cut into pellets.

The color of the pellets was measured with TC-1500DX, a color difference meter of Tokyo Denshoku K.K. The b value of the pellets was 1.2, indicating that the pellets were satisfactorily white with only a small intensity of yellowness. The measured value of IV was 0.648, indicating successful control by polycondensation.

The pellets were fed into an extruder at 290° C., from which the extrudate was brought into contact with a rotating chill drum so as to form an amorphous sheet 1.1 mm thick. The sheet was stretched first longitudinally at a draw ratio of 3.0 at 100° C., then transversely at a draw ratio of 3.0 at 110° C. The drawn sheet was heat-set at 200° C., cooled and wound up. The so prepared film had a thickness of 125 μm and was white and opaque. The drawing and shaping operations could be performed in a continuous stable manner.

This film was purely white without any color that might have been produced by decomposition products of the polymer. It was therefore very useful as a reflective photographic support.

COMPARATIVE EXAMPLE 3

PET pellets of IV 0.65 that had been prepared in a continuous polycondensation apparatus and titanium dioxide were kneaded at a weight ratio of 80:20 in a twin-screw kneader (Model PCM-65 of Ikegai Iron Works, Ltd.) and the extrudate was shaped into pellets. The pellets had an IV of 0.52 and were intensely tinged with yellow (b value, 3.4).

An attempt was made to prepare a film from these pellets as in Example 3 but the longitudinally stretched film ruptured during transverse stretching and continuous drawing operations were unsuccessful.

COMPARATIVE EXAMPLE 4

The pellets obtained in Comparative Example 3 were subjected to solid-phase polymerization at 2 Torr for 18 hours at 210° C. The resulting pellets had an IV of 0.63 and were intensely tinged with yellow (b value, 3.8). A biaxially drawn film prepared from these pellets was also intensely yellowish and unsuitable for use as a reflective photographic support.

As described on the foregoing pages, the process of the present invention enables the fabrication of a polyester resin composition that suffers from very slight deterioration of quality such as low molecular weight and unwanted coloration and which exhibits a high degree of whiteness. In addition, such an improved polyester resin composition can be produced at a lower energy cost through fewer steps.

As a further advantage, a white film such as photographic paper or synthetic paper can be directly shaped from the polyester resin composition in molten state. The cost of producing these films is low and the number of process steps involved is reduced.

What is claimed is:

1. A process for producing a polyester resin composition containing at least 10 wt % of a white inorganic pigment dispersed in a polyester resin, which comprises kneading the polyester resin with the white inorganic pigment and thereafter subjecting the blend to a polycondensation reaction at a temperature ranging from the melting point of the polyester up to 300° C. and at a reduced pressure of not higher than 5 Torr.

2. A process according to claim 1 wherein said polyester resin is selected from the group consisting of polyethylene terephthalate, polyethylene 2,6-dinaphthalate, polypropylene terephthalate and polybutylene terephthalate.

3. A process according to claim 2 wherein said polyester resin is polyethylene terephthate.

4. A process according to claim 1 wherein said white inorganic pigment is at least one member selected from the group consisting of talc, lithopone, titanium dioxide, zinc oxide, barium sulfate, calcium carbonate, alumina, silica and kaolin.

5. A process according to claim 4 wherein said white inorganic pigment is titanium dioxide.

6. A process according to claim 1 wherein said polycondensation reaction is performed at a temperature in the range of 275°–290° C.

7. A process according to claim 1 wherein said polycondensation reaction is performed at a pressure of 1 Torr and below.

8. A process according to claim 1 wherein said white inorganic pigment is present in an amount of 10–30 wt % of said polyester resin composition.

9. A process for producing a polyester resin composition containing at least 10 wt % of a white inorganic pigment dispersed in a polyester resin, which comprises kneading and dispersing said white inorganic pigment in at least part of a molten polyester resin withdrawn from a continuous polycondensation apparatus, mixing the blend with a polyester resin also withdrawn from a continuous polycondensation apparatus but which has not been kneaded with the white inorganic pigment, and subjecting the resin mixture to a polycondensation reaction at a temperature ranging from the melting point of the polyester up to 300° C. and at a pressure not higher than 5 Torr.

10. A process according to claim 9 wherein at least part of the molten polyester resin withdrawn from the continuous polycondensation apparatus is kneaded with the white inorganic pigment at a temperature that satisfies the following condition:

$$Tm+5° C. \leq T \leq Tm+25° C.$$

where Tm is the melting point (°C.) of the polyester resin and T is the temperature (°C.) at which the polyester resin is heated.

11. A process according to claim 9 wherein said polyester resin that has been withdrawn from the continuous polycondensation apparatus but which has not been kneaded with the white inorganic pigment is mixed with the pigment-loaded polyester resin at a temperature that satisfies the following condition:

$$Tm+5° C. \leq T \leq Tm+25° C.$$

where Tm is the melting point (°C.) of the polyester resin, and T is the temperature (°C.) at which the polyester is heated.

12. A process according to claim 9 wherein said white inorganic pigment has a concentration of 20–60 wt % when it is kneaded and dispersed in the polyester resin.

13. A process according to claim 9 wherein said white inorganic pigment is titanium dioxide.

14. A process according to claim 9 wherein said white inorganic pigment is present in an amount of 10–30 wt % of said polyester resin composition.

15. A process according to claim 9 wherein said polyester resin is polyethylene terephthalate.

16. A process according to claim 9 wherein said polycondensation reaction is carried at a temperature in the range of 275°–290° C.

17. A process according to claim 9 wherein said polycondensation reaction is carried out at a pressure of no higher than 1 Torr.

* * * * *